United States Patent [19]

Figuly et al.

[11] Patent Number: 5,126,181
[45] Date of Patent: Jun. 30, 1992

[54] MICROPOROUS DISCS OF ELASTIC SEGMENTED POLYURETHANE

[75] Inventors: Garret D. Figuly, Wilmington; Linda H. Smith, Bear, both of Del.

[73] Assignee: E. I. Du Pont de Nemours and Company, Wilmington, Del.

[21] Appl. No.: 763,979

[22] Filed: Sep. 23, 1991

[51] Int. Cl.⁵ .......................... B32B 3/02; C08J 9/28
[52] U.S. Cl. ..................................... 428/64; 264/41; 264/DIG. 14; 428/318.8; 521/51
[58] Field of Search ............................. 428/64, 318.8; 264/DIG. 14, 41

[56] References Cited

U.S. PATENT DOCUMENTS

| | | | |
|---|---|---|---|
| 4,296,174 | 10/1981 | Hanzel et al. | 428/389 |
| 4,859,711 | 8/1989 | Jain et al. | 521/56 |
| 4,898,913 | 2/1990 | Ziemelis et al. | 525/301 |
| 4,921,842 | 5/1990 | Henning et al. | 524/839 |

*Primary Examiner*—Morton Foelak

[57] ABSTRACT

Solutions of segmented polyurethanes are coagulated to form flat circular microporous structures having a substantially continuous pore-free surface and a substantially open pore surface.

1 Claim, 3 Drawing Sheets

MICROPOROUS DISCS OF ELASTIC SEGMENTED POLYURETHANE

RELATED APPLICATION

This application is related to our U.S. application Ser. No. 07/631,269, filed Dec. 20, 1990.

BACKGROUND OF THE INVENTION

Elastic segmented polyurethane filaments are well known for their resistance to hydrolysis and for other desirable properties such as stretch recovery and power. These qualities make the filaments invaluable for use in swim suits and for other end-use applications. The present invention provides the elastic segmented polyurethane in a novel form which lends itself to a broad spectrum of new uses.

DRAWINGS

SUMMARY OF THE INVENTION

Figure 1:
FIG. 1 is an SEM of a surface view of a disc of the invention at 20× magnification showing the skin forming one side of the disc.

This invention provides a substantially flat circular microporous structure (disc) consisting essentially of elastic segmented polyurethane, said structure having on one side a substantially non-porous, continuous skin with essentially no pore openings, and, on the other side, a substantially open pore surface with pore openings of ~10 to ~2000 microns, said disc having a diameter of from 1 mm to 6 mm, a thickness of from 0.10 mm to 0.6 mm, a bulk density of from 0.30 to 40.0 g/cm$^3$, a total intrusion volume of from 1.0 to 2.0 cc/g$^3$, and a total pore area of 0.30 to 40.0 m$^2$/g, as determined by mercury porosimetry. Also encompassed is a process for making the disc. The product can be employed as insulation, as a carrier for slow release of imbibed substances, as cushioning material, as absorbents for organic solvent spills, as cell growth substrates, etc.

DETAILED DESCRIPTION OF THE INVENTION

The elastic shaped structures of this invention are manufactured from fiber-forming, long chain, synthetic polymer comprised of at least 85% of a segmented polyurethane. Preferably the segmented polyurethane is one based on polyether or polyester. Such polymers are prepared by well-known methods such as those described in U.S. Pat. No. 4,296,174 and in EPO application No. 343,985 published on Nov. 29, 1989.

To obtain the products of this invention, a solution of the polyurethane is first prepared. Suitable solvents include amide solvents, such as dimethylacetamide (DMAc), dimethylformamide (DMF) and N-methylpyrrolidone (NMP). Suitable solutions have a viscosity of between 30 and 100 centipoises, preferably from about 50 to 80 centipoises, at room temperature. In practice, polymer is added to the solvent until the desired viscosity is achieved. Generally, from about 3 to 6 and optimally 5% by weight of polymer in the solvent will result in a suitable viscosity.

The solution is then introduced as droplets of from about 0.01 to 0.05 cubic centimeters (cc.) into a coagulating bath which solidifies the polymer in the form of small flat circular structures or discs having a diameter of from about 1 to 4 mm. The coagulating bath comprises a liquid that extracts the solvent of the polymer solution but is a non-solvent for the polymer. Water is suitable for this purpose.

In a typical procedure, the discs may be prepared as follows:

A 5% solution of a segmented polyurethane in dimethylacetamide (DMAc) is prepared. A particularly preferred polyurethane is comprised of polytetramethylene ether glycol of molecular weight between 600 and 5000, preferably between 1500 and 2500, end-capped with methylene diphenylene diisocyanate and chain extended with aliphatic diamine. Droplets of about 0.04 cc. are released from about 45 cm. above through a non-coagulating zone, e.g., air, and into a container of water (depth about 30 cm.) at 25° C. Coagulation takes place almost immediately upon contact with the water and discs form which are collected from the bottom of the container.

As the droplets of solution enter the coagulation bath, solidification of the polymer of the droplet begins. Large droplets will, of course, produce large discs. Distances of from 20 to 60 cm. between the droplet release point and the coagulation bath have given satisfactory results.

The coagulated polymer, now in the form of substantially flat, circular structures or discs, are then separated from the coagulation bath, washed to ensure substantially complete removal of DMAc and subjected to drying. Temperatures and time for drying may vary considerably. Typically, a temperature range of from 25° to 80° C. is used, with drying best accomplished under vacuum at room temperature.

Figure 2:
FIG. 2 is an SEM of a surface view of a disc of the invention of 20× magnification showing the surface of the other side of the disc.

The discs are from 1 to 6 millimeters in diameter and from 0.10 to 0.60 millimeters in thickness and have a bulk density of from 0.30 to 0.40 g/cm$^3$. One surface appears as a substantially continuous skin (1) as shown in FIG. 1. This can be determined directly from the photomicrograph. This skin is formed at the bottom of the disc as the face of the droplet which first strikes the coagulant. The top of the disc is formed as the solvent slowly leaches out. As seen in FIG. 2, the top of the disc is a substantially open pore surface (2) with pore openings (3) of ~10 to ~2000 microns.

Figure 3:
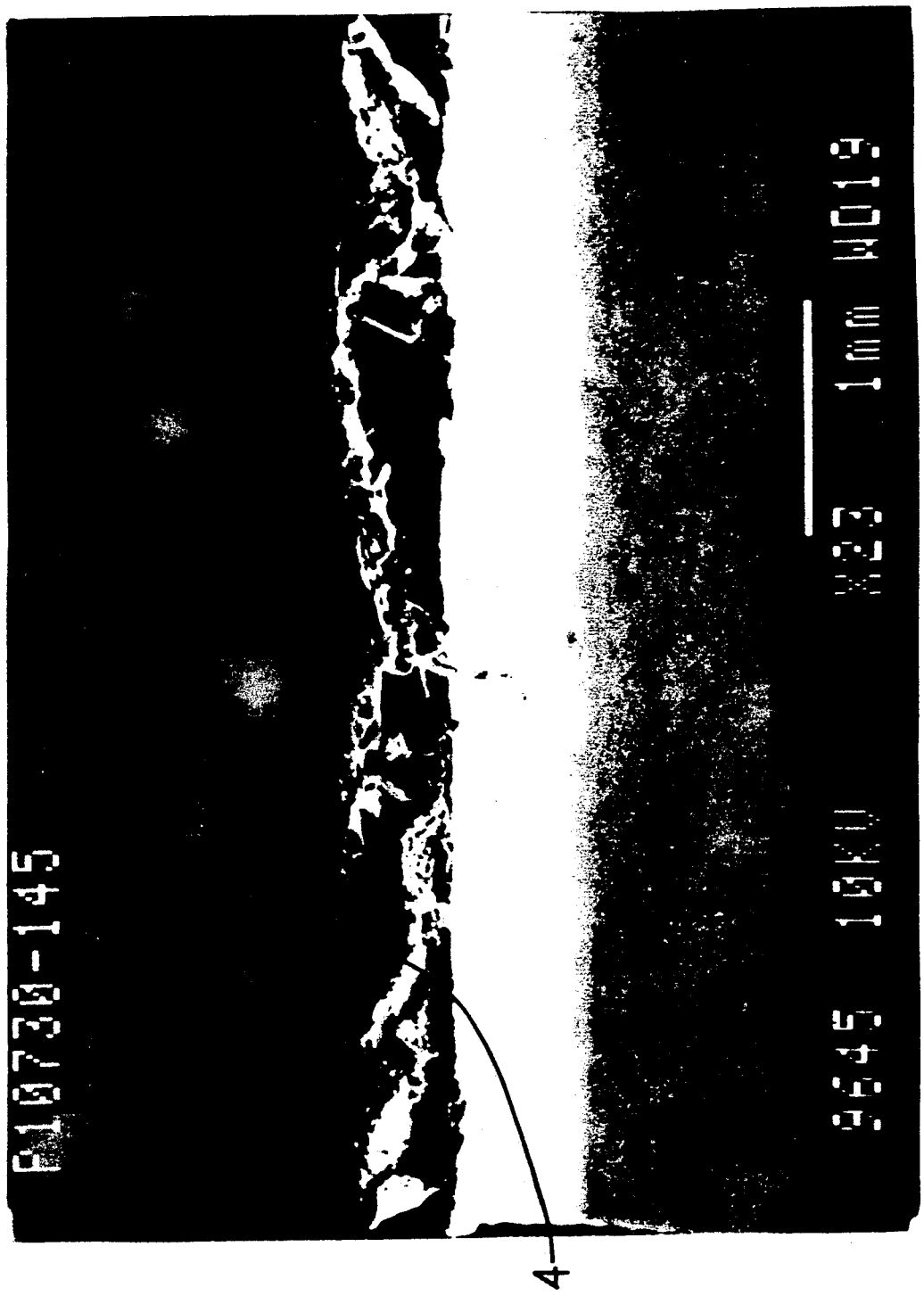
FIG. 3 is a scanning electron micrograph (SEM) of a cross-sectional view at 23× magnification of a substantially flat circular structure (disc) of the invention.

The disc is substantially porous throughout as seen in the cross-section of FIG. 3 and contains pores (4) of up to ~1500 microns. Mercury porosimetry, a technique discussed in "Adsorption, Surface Area and Porosity", Second Edition, Academic Press (1982) pp. 173-190, can be employed to reveal much about the porous structure. Particularly useful measures which can be obtained by this technique are the total intrusion volume, which for products of this invention, falls between 1.0 and 2.0 cc/g, and the total pore area, which lies between 0.30 and 40.0 m$^2$g.

TEST AND MEASUREMENT PROCEDURES

The samples are prepared for SEM as follows:

For the surface view, the disc sample was mounted directly onto an aluminum stub with double-face tape. The cross-section of the bead was obtained by submerging it in liquid nitrogen and cutting it with a razor blade.

The sectioned bead was then mounted on an aluminum stub with double-faced tape. A drop of carbon paint was applied to the samples, which were then sputter-coated with gold/palladium.

A scanning electron microscope (SEM) that was used in obtaining the micrographs was a JEOL 840. The images were acquired from secondary electrons. The accelerating voltage was 5 KV. Micrographs were taken at various magnifications.

Mercury Penetration Porosimetry - A Micromeritics Model 9200 automated mercury penetration porosimeter was employed for measuring total intrusion volume ($cm^3/g$), total pore area ($m^2/g$) and bulk density ($g/cm^3$).

Total intrusion volume is the maximum volume of mercury penetration into the pores of the sample.

Total pore area is the area of the pore walls based on the assumption of cylindrical geometry and summed over the complete pressure range of mercury penetration.

Bulk density is calculated from the sample weight and the sample volume at the initial filling pressure with mercury.

EXAMPLE

This Example illustrates the preparation of microporous elastic segmented polyurethane discs of the invention.

A homogeneous solution (concentration of ~5 wt. % polymer) was prepared from DMAC (678 g) and the polyurethane described in Example 1 of U.S. Pat. No. 4,296,174 (Col. 5 and 6) (37 g), namely, a polyurea-urethane comprising a polytetramethylene ether glycol of molecular weight about 1800, end-capped with methylene diphenylene diisocyanate and chain extended with a mixture of aliphatic diamines, except that the ethylene diamine/1,3-cyclohexylenediamine ratio was 90/10 and the capping ratio was 1.62. The solution had a viscosity of 71 centipoise at room temperature as measured by a Brookfield viscometer. The solution was loaded into a 500 ml pressure equalizing dropping funnel which was placed at least 18 inches above the surface of ~10 liters of distilled water contained in a 14 liter bucket. Into the center of the bucket of water was placed a wide paddle agitator connected to an air motor. The agitator shaft was fitted with a wide Teflon ® bushing at water level to prevent the product from wrapping around the stirrer shaft. The agitator was kept moving at a medium to slow rate. The dropping funnel was placed over the outer perimeter of moving water, and the solution was dripped (0.01 to 0.05 cc. droplets) into the water at a rate which did not exceed 1 drop per second. The resulting droplets "puddled" on the water surface and were initially quite gel-like; however, within 15 minutes would become opaque white and elastic discs. Agitation was continued until all of the solution was used (5-8 hours). The discs were then isolated and put into a bucket of agitated fresh water. This process was repeated hourly for at least 4 hours. After the discs were thoroughly washed (3-7 days) they were drained and excess water was pressed out. They were then loaded into aluminum pans and placed in a vacuum oven at room temperature for 4-7 days. During this time the discs were occasionally agitated. The resulting dry discs were uniform and approximately 3-5 mm in diameter. Approximate yield was 10-20 g per batch.

Scanning electron micrographs of a sampling of the discs were made. They showed one substantially continuous surface and one open pore surface with pore openings in the range of ~10 to ~2000 microns. The discs had a diameter of 4.5 millimeters and a thickness of 0.49 millimeters measured as an average of 2 samples. The discs had a bulk density of 0.3217 $g/cm^3$, a total intrusion volume of 1.9075 $cm^3/g$ and a total pore area of 32.4705 $m^2/g$, all determined via mercury penetration porosimetry.

While the above examples illustrate shaped microporous structures of pure elastic segmented polyurethane, it will be apparent to those skilled in the art that dyes, pigments and other additives may be incorporated in minor amounts in the polymer solution prior to producing the droplets to the extent they are compatible with or soluble in the solvent. Also, structures of polymer blends may be prepared by dissolving other polymers in the polyurethane solution before formation of the shaped structures. In general, these other polymers, such as poly(m-phenylene isophthalamide) are added in minor amounts to not adversely affect the utility of the structure while imparting other desired qualities.

We claim:

1. A substantially flat, circular, microporous disc consisting essentially of elastic segmented polyurethane having on one side, a substantially non-porous continuous skin and, on the other side, a substantially open pore surface with pore openings of ~10 to ~2000 microns, said disc having a diameter of from 1 mm to 6 mm, a thickness of from 0.1 mm to 0.6 mm, a bulk density of from 0.30 to 0.40 $g/cm^3$, a total intrusion volume of from 1.0 to 2.0 $cm^3/g$ and a total pore area of 0.30 to 0.40 $m^2/g$, said intrusion volume and pore area values determined by mercury porosimetry.

* * * * *

UNITED STATES PATENT AND TRADEMARK OFFICE
CERTIFICATE OF CORRECTION

PATENT NO. : 5,126,181

DATED : June 30, 1992

INVENTOR(S) : Garret Daniel Figuly
Linda Hayes Smith

It is certified that error appears in the above-identified patent and that said Letters Patent is hereby corrected as shown below:

Col. 1, line 41, the value "40.0 g/cm$^3$" should read --0.40 g/cm$^3$--

Col. 4, line 49, the value "0.40 m$^2$/g" should read --40.0 m$^2$/g--

Signed and Sealed this

Twenty-first Day of September, 1993

Attest:

BRUCE LEHMAN

*Attesting Officer*  *Commissioner of Patents and Trademarks*